Oct. 15, 1940.                 J. W. TAYLOR                 2,218,365
                        PROCESS OF CLEANING RESINS
                        Filed May 10, 1939            3 Sheets-Sheet 3
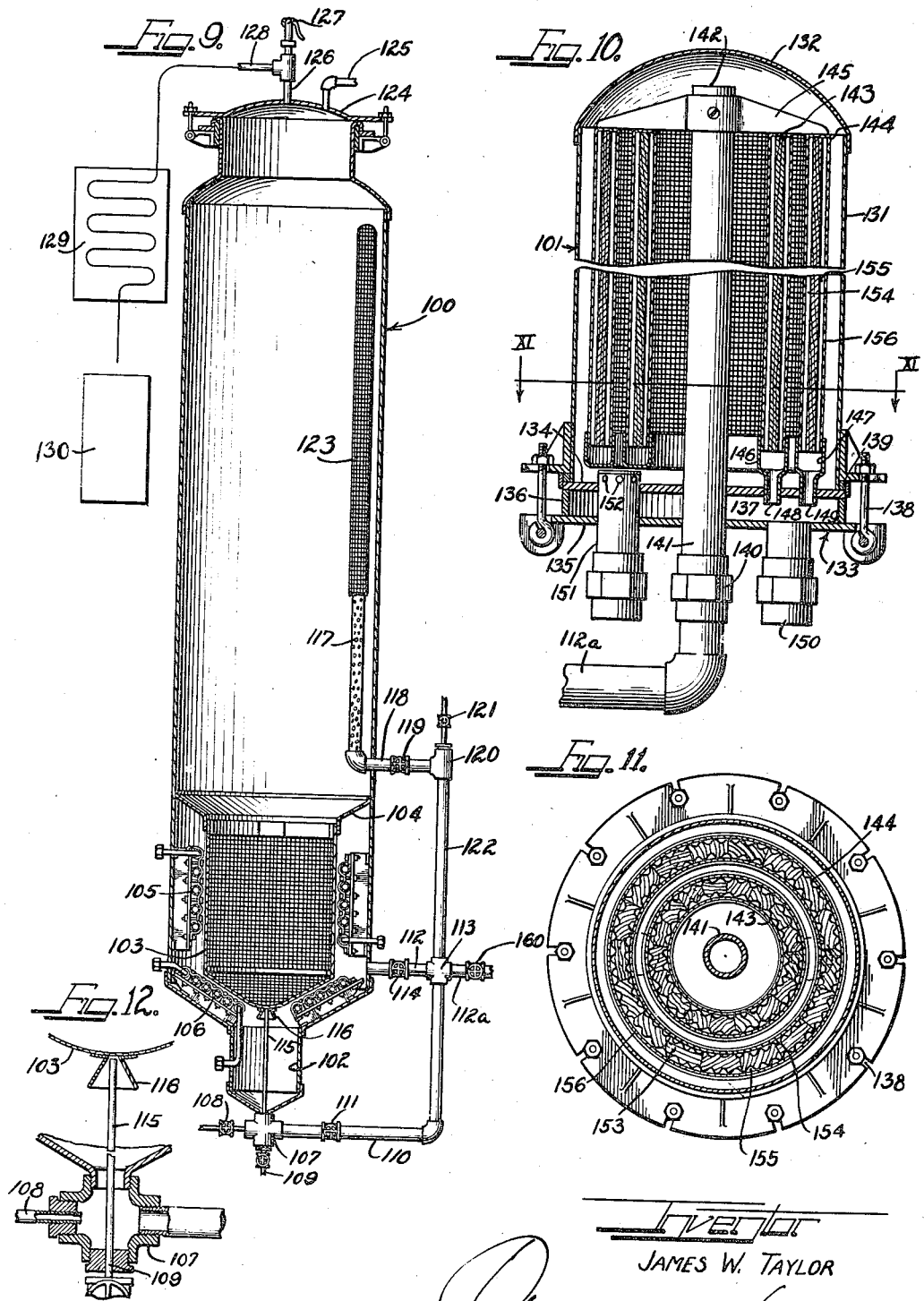

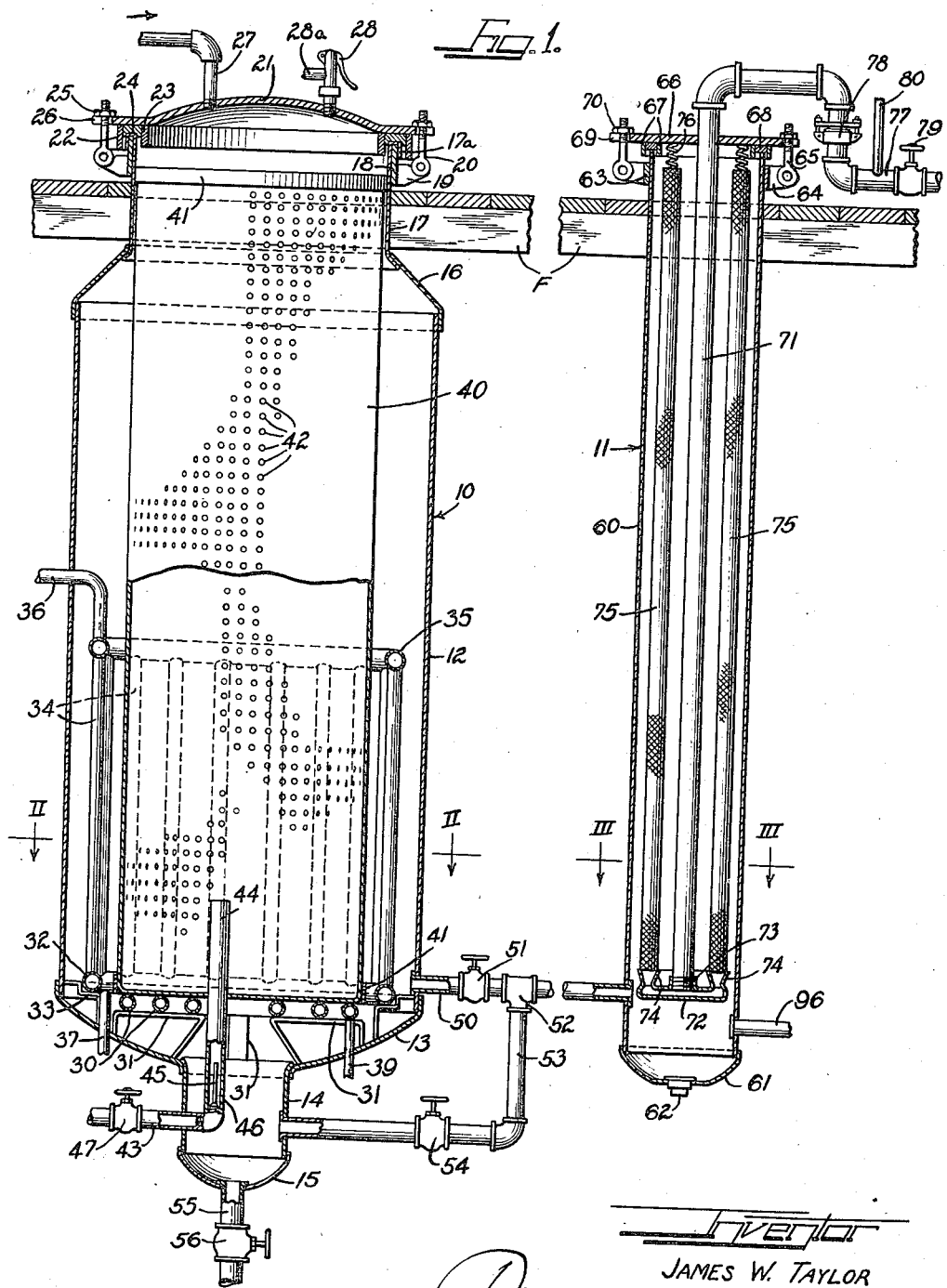

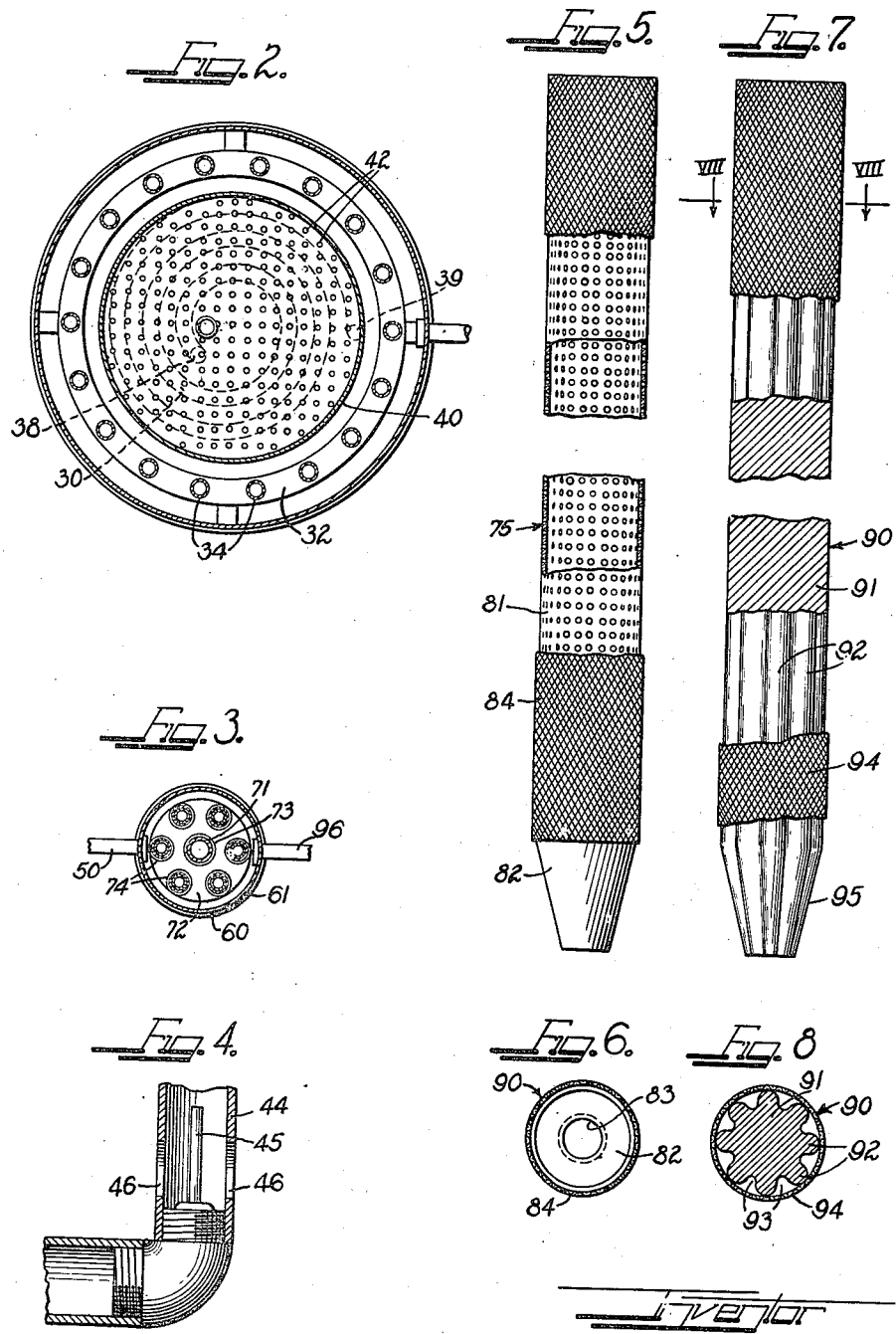

Patented Oct. 15, 1940

2,218,365

UNITED STATES PATENT OFFICE 2,218,365

PROCESS OF CLEANING RESINS

James W. Taylor, Pensacola, Fla., assignor to Peninsular-Lurton Company, Pensacola, Fla., a corporation of Florida Application May 10, 1939, Serial No. 272,744

14 Claims. (Cl. 260—107)

This invention relates to a process for removing solid foreign matter from the crude exudate or oleoresin collected from pine trees and the like, as in the manufacture of gum rosin or other resins or gums.

More specifically the invention relates to a process for removing wood chips, bark, sand, insects and other solid extraneous matter from the crude oleoresin, or turpentine, as it is collected from trees.

This application is a continuation-in-part of my copending application entitled: "Apparatus for cleaning resins," U. S. Serial No. 208,083, filed May 14, 1938.

Oleoresin or gum as usually delivered to a refining plant is in a very crude state containing many foreign bodies. According to this invention, said solid foreign bodies, or bodies of considerably higher melting points than the desired oleoresin, are removed from the resin to produce a purified product.

In carrying out the process of this invention, crude oleoresin, containing all of the usual solid impurities therein, is dumped into a melting tank having a perforated basket, plate or the like capable of retaining the larger sized solid foreign particles. The melting tank, or digester, is equipped with steam coils beneath the basket and extending around the lower wall portion of the basket. The heating tank or digester is sealed from the atmosphere and steam is supplied to the heating tank for melting a portion of the resin in the basket.

The melted resin drains to the bottom of the heating tank, and when a sufficient quantity has been collected in the bottom of the tank, a steam injector is actuated to further heat and recirculate the melted resin back into the basket. This recirculated heated resin is forced upwardly into the mass of resin in the basket to speed up the melting operation.

When all of the resinous material has been melted in the heating tank, the steam injector is shut off and the finer solid impurities capable of passing through the basket are allowed to settle to the bottom of the tank. This settling operation removes appreciable amounts of sand, dirt and the like heavy solid materials.

After the settling operation, the molten resin is forced through filters having extended filtering surfaces, which are capable of retaining any remaining solid ingredients entrained in the molten resin.

The resin first fed to the filters is removed from the heating tank at a point well above the bottom thereof so that the sediment at the bottom of the tank will not come through at the first and rapidly clog the filters. Then, after the less polluted resin has been filtered, the settlings can be filtered through the same filters.

The retaining of the larger sized solid ingredients in the perforated basket, and the settling out of the denser solid impurities from the molten resin, according to this process, greatly speeds up the cleaning operation and increases the capacity of a given filter area.

It is, then, an object of this invention to provide a process for rapidly and efficiently removing solid foreign matter from crude oleoresin and other resins, gums or the like.

Another object of the invention is to provide a process for cleaning oleoresin that includes a coarse filtering operation to remove large sized solid ingredients, a settling operation, and a finer filtering operation.

A further object of the invention is to provide a process for rapidly cleaning resin material containing foreign particles, which process includes a partial melting of the resinous material and a recirculation of the melted material back to the unmelted material, to speed up the melting operation.

A further object of the invention is to provide a method of cleansing fusible material containing solid particles of higher melting point by partially melting the fusible material and steam injecting the melted material back into the solid unmelted material for speeding up the melting operation.

Other and further objects of the invention will become apparent to those skilled in the art from the following detailed description of the annexed sheets of drawings which disclose suitable apparatus for carrying out the process of this invention.

On the drawings:

Figure 1 is a vertical cross-sectional view, with parts shown in elevation, of a cleaning device embodying this invention and including a heating tank or digester and a filter unit.

Figure 2 is a horizontal cross-sectional view taken along the line II—II of Figure 1.

Figure 3 is a horizontal cross-sectional view taken along the line III—III of Figure 1.

Figure 4 is a detail view, partly in section, of the steam jet pump forming part of the apparatus shown in Figure 1.

Figure 5 is a broken elevational view of one of the filtering tubes, with parts broken away and shown in vertical section.

Figure 6 is a top plan view of the filter tube shown in Figure 5.

Figure 7 is a broken elevational view of an alternative form of filter tube usable in the filter apparatus, with parts broken away and shown in vertical section.

Figure 8 is a horizontal cross-sectional view taken along the line VIII—VIII of Figure 7.

Figure 9 is a vertical sectional view of a modified form of heating tank or digester, with parts in elevation and with additional connected apparatus shown schematically.

Figure 10 is a broken vertical section of a modified form of filter unit, with parts shown in elevation.

Figure 11 is an enlarged sectional view taken substantially on the line XI—XI of Figure 10.

Figure 12 is an enlarged detail view of the modified form of steam injector shown in Figure 9.

As shown on the drawings:

In Fig. 1 the reference numeral 10 designates generally the heating tank or digester unit and the reference numeral 11 designates generally the filter unit of the apparatus.

The heating tank 10 comprises a cylindrical imperforate metal shell 12 having a dished bottom head 13 riveted and/or welded to the lower end thereof. The head 13 has a central opening receiving a cylindrical sump forming member 14, which is closed by a dished cap 15. A drain line 55, provided with a valve 56, is connected through said cap 15 to drain the sump so formed.

To the top portion of the cylinder 12 is welded a convergent ring 16, into the smaller upper end of which a cylindrical member 17 is fitted and welded. A reinforcing steel collar 18 is riveted or welded around the upper end of the cylinder 17, the edge 17a of which is turned down over the outside of the collar 18. Said collar 18 is provided with lugs or ears 19 that project radially therefrom at spaced intervals for pivotally supporting eye bolts 20.

A cover 21 closes the upper end of said tank 10. Said cover is provided on its under surface with spaced annular rings 22 and 23 that form a groove for receiving the top edge 17a of the cylinder 17. An annular gasket 24 is disposed in the groove between the rings 22 and 23 to form a seal for the cover 21 when the latter is clamped in place by means of nuts 25 threaded on the eye bolts 20. The eye bolts 20 normally project through radial slots 26 in the periphery of the cover 21.

In installing the tank 10, it is convenient to have the cylindrical neck portion 17 extend through the floor F to facilitate the charging or loading operation.

The cap 21 has a steam inlet pipe 27 threaded therethrough and carries a safety valve 28, which controls a discharge pipe 28a for venting steam, water vapor and vapors of spirits of turpentine.

A spiral heating coil 30 is mounted in the bottom of the tank 10 on supports 31, which are welded to the bottom head 13.

An annular steam header 32, as best shown in Figs. 1 and 2, is also mounted in the bottom above the coil 30 on supports 33 welded to the bottom head 13. The supports 31 and 33 are positioned at spaced intervals around the bottom head so as to permit flow of liquid from the top portion of the tank 10 into the sump 14.

Spaced vertical steam pipes 34 extend upwardly from the header 32 to about mid-height of the tank and terminate in an upper annular header 35. Steam is supplied to the upper header 35 through a pipe 36 that passes through the side wall of the cylinder 12, any condensate and exhaust steam being removed from the bottom header 32 through a drain line 37 extending through the bottom head 13.

Steam is supplied at the center of the coil 30 through a pipe 38 (Fig. 2) and condensate and exhaust steam are removed at the outer end of the coil through a pipe 39.

An elongated cylindrical basket 40 of foraminous metal is mounted within the tank 10, with its bottom resting on top of the spiral coil 30 and with its upper end snugly fitting within the cylindrical neck 17. Metal reinforcing rings 41 are secured around the top and bottom of the basket.

The perforations 42 in the side wall and bottom of the basket 40 are preferably not over ¼ inch in diameter. If desired, a metal screen can form the body of the basket.

A jet pump 43 is mounted in the sump 14 with its discharge leg 44 extending upwardly for a short distance through an opening provided for the purpose in the bottom of the basket 40. As best shown in Figure 4, the jet pump includes a restricted jet 45 fitted within a lower portion of the vertical leg 44 that is provided with circulating openings 46. A valve 47 is provided for controlling flow of steam through the jet 45. In operation the molten resin, or other fluid substance in the sump is drawn in through the openings 46 by the action of the high velocity steam discharged through the jet 45. The mixture of steam and molten resin is thus drawn upwardly into the basket for a purpose to be more fully hereinafter described.

A pipe 50 enters the side wall of the cylinder 12 above the bottom head 13 for conveying material from the tank 10 to the bottom of the filter unit 11. The pipe 50 has a T fitting 52 into which is connected a branch pipe 53 from the sump portion 14 of the tank 10. The pipe 50 and branch pipe 53 are provided with valves 51 and 54, respectively.

The filter unit 11 comprises a cylindrical metal casing 60, the upper end of which also projects through the floor F. A bottom head 61, provided with a drain plug 62, is welded to the lower end of the casing 60.

A ring 63, secured around the top end of the casing 60 above the floor F, is provided with laterally projecting peripherally spaced lugs or ears 64 for supporting swinging eye bolts 65.

A cap 66 having spaced rings 67 on the inner face thereof is adapted to be mounted on top of the casing, with the rings 67 forming an annular groove for receiving a gasket 68 that provides a seal between the top of the casing and said cap 66. The periphery of the cap has spaced slots 69 into which the eye bolts 65 are swung when the cap 66 is to be clamped to the casing. Nuts 70 on the eye bolts 65 are turned down against the top of the cap.

A manifold pipe 71 extends axially of the casing 60 through the cap 66, in which its upper end is secured, and terminates in spaced relation above the bottom head 61, preferably at about the level of the mouth of the pipe 50. A circular manifold member 72 having a central opening defined by a boss 73 is threaded on the end of the pipe 71. The manifold member 72 has a plurality of upwardly flaring annular mouths 74 positioned at spaced intervals around its periphery, six of such mouths being shown in Figure 3. Vertical filtering tubes 75 are seated at their lower ends in the mouths 74 of the manifold 72 and are held therein by means of springs 76 compressed between the cap 66 and the upper closed ends of said tubes. In this manner communication from the interior of each tube 75 is made with the pipe 71.

The pipe 71 is connected to a discharge line 77 through an easily detachable union 78. Upon disconnection of said union 78 and release of the eye bolts 65, the cap 66, pipe 71, manifold 72 and filtering tubes 75 may be lifted out bodily as a unit for cleaning or replacement. A valve 79 is provided in the line 77 and a steam inlet pipe 80 connected into said line 77 ahead of the valve for a purpose to be hereinafter more fully described.

As best shown in Figures 5 and 6, each of the filter tubes 75 comprises a perforated metal cylinder 81 closed at the top thereof and having a convergent end 82 provided with an opening 83 at the bottom thereof. Each tapered end 82 is adapted to seat in a mouth 74 of the manifold 72. A filtering medium such as cotton batting, or a porous textile fabric or other fine mesh screening material 84 is wrapped or otherwise tightly disposed around the cylindrical portion of each tube 81 for the full length thereof.

Molten resin introduced into the casing 60 can thus be forced through the filter screens 84 and the perforations of the tubes 81 into said tubes 81 and thence into the manifold 72, from which the resin passes upwardly under a pressure head out through the pipe 71.

If desired, perforated metal tubes such as 75 can be replaced with wooden filtering units such as 90 disclosed in Figures 7 and 8. Each of the units 90 comprises a solid wooden rod 91 having longitudinally extending flutes 92 providing grooves or passageways 93 along the length of the rod, and a fine mesh screen sleeve 94 tightly disposed around the rod.

Each rod 91 has a convergent lower end 95, fluted in the same manner as the length of the rod, that fits into a mouth 74 of the manifold 72 so that molten resin draining along the passageways 93 must flow into the manifold.

As shown in Figure 1, the bottom portion of the casing 60 has an inlet 96 through which steam may be introduced for agitating and heating the contents of the casing, or for drying filter cakes on the tubes 75.

In carrying out the process of this invention, the crude oleoresin, gum, or other meltable solid is charged into the basket 40 of the tank 10. For the purposes of this description, it will be assumed that oleoresin is the particular material to be cleaned. The tank is then sealed by clamping the cover 21 thereon, and steam is introduced into the heating coil 30 and the bank of vertical heating tubes 34. The oleoresin in the bottom portion of the basket becomes quickly heated above its melting point and some molten oleoresin drains through the perforations of the basket into the bottom portion of the tank. The basket, however, retains the larger sized solid foreign matter.

When sufficient material is melted and drained into the bottom of the tank to cover the openings 46 of the jet pump 43, the valve 47 is opened to eject steam through the jet 45 and recirculate molten oleoresin back into the bottom portion of the basket 42 into contact with the solid resin remaining in the basket. The live steam so introduced through the jet pump increases the temperature of the molten oleoresin flowing therethrough and mixes directly therewith.

The operation is continued until all of the desired meltable material is in a flowable state. The jet pump is then stopped by closing the valve 47 and the molten mass in the tank 10 is allowed to stand to permit the finer solid material passing through the basket 40 to settle into the sump 14. In this manner, heavier solid material such as sand and sediment settles out below the level of the pipe 50.

After the settling operation, the valve 51 in the pipe line 50 is opened while the valve 54 in the branch pipe 53 remains closed.

Steam is introduced into the top of the tank 10 through the inlet pipe 27 to force the molten resin lying above the level of the pipe 50 into the casing 60 of the filter unit 11. The valve 79 in the discharge line 77 connected with the pipe 71 is opened and the molten resin filling the casing 60 is forced through the filter screens into the tubes 75. The molten resin flows down through the tubes 75 into the manifold 72 and is forced by the pressure differential existing between the interior of the casing and the interior of the pipe 71 upwardly through the pipe and into the line 77. If desired, steam may be introduced into the casing 60 through the inlet 96 to further heat the molten resin.

When the melted material in the tank 10 is drained down to the level of the pipe 50, the valve 51 is closed and the valve 54 in the branch pipe 53 is opened to discharge the more polluted resin from the sump 14 into the casing 60 of the filtering unit for filtration through the filter tubes 75.

The sediment beneath the level of the opening of the branch pipe 53 in the sump 14 can finally be drained out through the drain line 55 by opening the valve 56.

After the filtering operation, the filter cake on the screens 84 of the tubes 75 can be removed or loosened, after closing the valve 79 in the drain line 77, by introducing steam through the inlet 80 into the pipe 71 for flow through the tubes 75 and out of the perforations thereof to blow the filter cake off of the screen surfaces. The solid material removed from the tubes collects at the bottom of the casing 60, from which it can be removed by removal of the plug 62.

The filter tubes themselves can be readily removed from the casing 60 by merely removing the cap 66 which releases the springs 76 and permits the tubes to be lifted out of the casing.

A process similar, in general, to that just described, may be carried out in a modified form of apparatus, such as that shown in Figs. 9 to 12 inclusive. In these figures of the drawings, the reference numeral 100 indicates generally a heating tank or digester of modified construction, and the reference numeral 101 a filter unit also of modified construction from that shown in Fig 1. The heating tank 100 is provided with a lower sump chamber 102, above which is mounted a perforated basket 103. Said basket 103 is supported in the lower portion of the tank 100 by means of a downwardly convergent flanged ring 104, which holds the basket with its walls in spaced relation to the cylindrical side wall and convergent bottom wall of the tank. Heating coils 105 and 106 are positioned in the space so formed.

At the bottom of the sump 102 is provided a cross connection 107, into one side branch of which extends a valve controlled steam pipe 108, and into the lower branch of which extends a valve controlled steam pipe 109. Into the other side branch of the fitting 107 is secured a discharge pipe 110 having a valve 111. Said pipe 110 joins an upper discharge pipe 112 by means of a cross fitting 113. The pipe 112 is fitted into the lower cylindrical wall of the tank 100 at a point above the sloping bottom thereof and is provided with a valve 114 for controlling the flow of melted oleoresins delivered from said tank 100 into the filter unit 101 through a continuation 112a beyond said fitting 113.

As best shown in Fig. 12, the vertical steam pipe 109 extends through the cross fitting 107 and terminates in a jet 115 within an inverted funnel-shaped member 116 secured to the bottom of the basket 103. Steam introduced through the valve pipe 109 and jet 115 thus serves to draw melted oleoresins from the sump 102 back into the interior of the basket 103, in much the same fashion as the jet pump 43 of Fig. 1.

An additional feature of the modified form of heating tank shown in Fig. 9 includes a strainer pipe 117 extending vertically within the tank 100 for substantially the full length of the tank above the perforated basket 103. The lower portion of said strainer pipe 117 is connected through the wall of the tank 100 by means of a pipe 118, provided with a valve 119, to a T-fitting 120. A valved steam pipe 121 enters the top of said T-fitting 120, while a length of vertical piping 122 extends from the bottom side of said T-fitting 120 to the top branch of the cross fitting 113. The strainer pipe 117 is perforated throughout its length within the tank 100 and is provided with a wire strainer 123 covering it. Melted resins may thus pass through the strainer 123 and the perforations of the strainer pipe 117 into the pipe 118 and be circulated by the action of the steam entering through the valved pipe 121 through the pipe length 122 and back into the bottom of the tank 100 through the pipe 112 and valve 114.

The top of the tank 100 is provided with a sealing cap or head 124. A steam inlet pipe 125 enters said head 124 for the admission of steam under sufficient pressure to force the melted contents of the tank over into the filter unit 101.

Said head 124 also carries a vent pipe 126 controlled by a safety valve 127, through which steam, water vapor and the vapor of spirits of turpentine are discharged into a pipe 128 leading to a condenser 129 and a storage tank 130.

The filter unit 101 comprises a cylindrical shell 131 having an upper dished head 132 secured thereto and a lower removable head 133. Said head 133 comprises an upper plate 134, a lower plate 135 and a spacing ring 136 joining said plates to form a chamber 137 therebetween. Said head 133 is secured in place against the lower end of the cylindrical body portion 131 by means of swing bolts 138, a gasket 139 affording a tight seal therefor.

The pipe 112a is connected through a valve 160 by means of a coupling union 140 to a vertical length of pipe 141 which extends centrally through said head 133 and terminates in an open end 142 in spaced relation to the dished head 132 of said filter unit 101. The filtering means proper comprise a plurality of concentric, cylindrical filtering members 143 and 144, the upper ends of which are held in position by means of a winged retainer member 145 secured to the upper end of the pipe 141. The lower ends of said filter members 143 and 144 fit into annular troughs 146 and 147, respectively, from which outlet nipples 148 and 149 discharge the filtrate into the chamber 137. Filtrate from said chamber 137 may be withdrawn therefrom through an outlet pipe 150, while unfiltered residue is withdrawn through an outlet pipe 151 having an apertured end 152 extending into the main interior of the filter shell 131 above the upper plate 134.

Each of the filter members 143 and 144 comprises a cylinder 153, formed of wood or other suitable material, and having fluted inner and outer surfaces 154 and 155, respectively. Wire mesh screening 156 covers said outer and inner fluted surfaces to permit the filtration of melted oleoresins therethrough into the channels provided by the fluting and thence into the collecting troughs 146 and 147. The upper ends of said channels, provided by the flutings referred to, are covered by a connecting portion of said screening material 156 so as to prevent unfiltered oleoresions from entering said upper ends directly.

In the operation of the apparatus shown in Figs. 9 to 12 inclusive, the crude oleoresin is charged into the tank 100 to substantially fill the same. Steam is then admitted to the coils 105 and 106 to melt the portion of the oleoresins contained within the basket 103. As soon as the oleoresin has become sufficiently heated to cause the sump 102 to become filled with molten oleoresins, steam is admitted through the pipe 109 and jet 115 to effect a recirculation of such melted portions through the contents of the basket 103, the force of the steam jet drawing such melted portion upwardly through the opening of the inverted funnel-shaped member 116 into said basket. Either simultaneously with the operation of the steam jet 115, or separately therefrom, steam is introduced through the valved pipe 121 into the fitting 120, the valves 119 and 114 being opened and the valves 111 and 160 being closed. The jet action of the steam issuing under pressure into the fitting 120 draws molten oleoresin through the strain pipe 117 and circulates it down through the pipe length 122 and into the bottom of the heating tank through the pipe connection 112. The heated mixture of steam and oleoresins flows upwardly about the steam coil 105 into the top of said heating tank and aids in the melting of unmelted portions of the charge. The cycle is repeated until the entire charge is completely melted.

During the introduction of direct steam into the charge within the heating tank 10, the safety valve 127 is either set to relieve continuously, or is manipulated by the operator to vent as required by the demands of the system. Initially, during the heating operation, a large proportion of the steam injected into the charge condenses to form an emulsion with the oleoresin. As the heat liberated from the steam in condensing gradually raises the temperature of the mass, more and more of the steam is vented through the valve 127. Such steam carries with it vapors of spirits of turpentine, in order to recover which it is desirable to condense the steam and vapors in a condenser 129, from which the condensate is run into a storage tank 130. The turpentine may be recovered therefrom by simple distillation.

When the temperature of the mass reaches about 160° F., the water and oleoresins begin to separate to some degree. The water can be observed forming into larger sized globules, and the mass becomes thinner until a temperature of between 180° and 200° F. is reached, at which temperature the mass is in a highly melted state and the water, which theretofore formed a thick emulsion at the lower temperatures, does not interfere with the filtration of the melted mass.

After the melting of the charge in the heating tank 100 has been completed, the valves 119, 121, and 111, and the valves in the steam pipes 108 and 109 are closed, while the valve 114 in the pipeline 112 and the valve 160 in the connecting pipeline 112a are opened. Steam is then introduced into the top of the heating tank through the steam inlet pipe 125, with the release valve 127 also closed, to force the liquid melt out through the pipe 112 and connecting pipe 112a into the filter unit 101. The molten mass passes up through the vertical pipe 141 and out the open end 142 thereof to spread over the top of the filter members 143 and 144. The differential pressure on the outside and inside of said filter members, as caused by the steam pressure above the charge in the heating tank 100, forces the molten oleoresins through the filtering membrane covering said filter members, and the filtrate runs downwardly in the channels provided by the fluting to collect in the concentric troughs 146 and 147, from which the filtrate passes into the collecting chamber 137 and out through the outlet pipe 150. After all of the filtrable material has been passed through said filter members 143 and 144, a non-filtrable residue is drained out through the pipe 151.

As previously described, the more highly contaminated portion of the molten charge in the bottom of the heating tank 100 and in the sump 102 may be put through the filter unit 101 after the main body of the charge has been filtered. To do this, the valve 114 is closed and the valves 108, 160 and 111 are opened, and steam is introduced through the valve 108 to aid in forcing the remaining portion of the molten charge through the pipelines 110 and 112a into the filter unit 101.

After the mixture of oleoresin and condensate has passed through the filter unit, it is either placed in storage tanks or run into a batch still. If it is placed in a storage tank, emulsification again takes place as the mass cools. Any excess water settled out of the saturated emulsion, either to the top or bottom of the storage tank, depending upon the gravity differential between the emulsion and water, may be drained off. If the hot mass is run directly into a batch still, the water is distilled off with the spirits of turpentine and the turpentine separated from the water by decantation. The rosin left in the still is run off into barrels, in which it solidifies upon cooling.

The process of the invention, as is evident from the above description, includes the recirculation of hot molten resin to assist in the melting of the remaining solid resin. Coarse solid particles are separated from the meltable material by being retained in the basket. The heavier, finer solids are separated by gravity settling, thereby increasing the capacity of the filters. The process includes the recovery of clean resin from the sediment only after the filtration of the resin that has already been partially cleaned by the settling out step. In this manner the capacity of the filtering unit is greatly increased.

I am aware that many changes may be made and numerous details of the process may be varied through a wide range without departing from the principles of this invention, and I, therefore, do not purpose limiting the patent granted hereon otherwise than necessitated by the prior art.

I claim as my invention:

1. The process of cleansing oleoresin containing relatively infusible solid particles, which comprises heating a batch of crude oleoresin until a quantity of molten material has formed, separating said quantity of molten material from the unmelted portion of said batch, steam injecting the separated molten material back into said unmelted portion of the batch to melt any solid oleoresin remaining therein, continuing the heating and steam injection until all of the oleoresin of the batch is in a flowable state, settling sand and sediment out of the molten oleoresin and forcing the oleoresin from a level above that of the settled out particles through a barrier capable of restraining the passage therethrough of solid particles suspended in the molten oleoresin.

2. The process of cleansing meltable resin containing solid impurities of relatively higher melting points which comprises heating a batch of said resin to partially melt the resin, removing molten resin portions through a barrier sized to retain the large solid impurities in the batch, heating and recirculating the removed molten resin portions through the unmelted portion of the batch, continuing the heating, removing, and recirculating until substantially all of the resin portion of the batch is molten, forming a pond of the molten resin, settling out finer solid impurities to the bottom of the pond, and separating the cleaner molten resin constituting the top portion of the pond from the bottom portion.

3. The process of cleansing meltable resin containing solid impurities of relatively higher melting points which comprises heating a batch of said resin to partially melt the resin, removing molten resin portions through a barrier sized to retain the large solid impurities of the batch, heating and recirculating the removed molten resin portions through the unmelted portion of the batch, continuing the heating, removing, and recirculating until substantially all of the resin portion of the batch is molten, forming a pond of the molten resin, settling out finer solid impurities to the bottom of the pond, applying a fluid under pressure to the top of the pond to create a positive pressure in the pond and successively blowing the top portion and the bottom portion of the pond through a barrier sized to retain the remaining solids in the molten resin.

4. In the process of refining crude oleoresin containing relatively higher melting point impurities, the steps which comprise heating a batch of said crude oleoresin to melt the oleoresin, withdrawing molten portions thereof free from large sized impurities, injecting steam directly into said withdrawn molten portions to heat the same and effect circulation of said heat portions upwardly through unmelted remaining portions of said batch and continuing said withdrawing, heating and circulating operations until all of the oleoresin in said batch is in a flowable state.

5. In the process of refining crude oleoresin containing relatively higher melting point impurities, the steps which comprise heating a batch of said crude oleoresin arranged in a relatively deep vertical mass to melt the oleoresin, withdrawing molten portions thereof throughout a major part of the depth of said mass through a perforated barrier to free said portions from large sized impurities, injecting steam directly into said withdrawn molten portions to heat the same and effect circulation of said heated portions upwardly through unmelted remaining portions of said batch and continuing said withdrawing, heating and circulating operations until all of te oleorosin in said batch is in a flowable state.

6. In the process of refining crude oleoresin containing relatively higher melting point impurities, the steps which comprise heating a batch of said crude oleoresin to melt the oleoresin, withdrawing molten portions thereof free from large sized impurities, injecting steam directly into said withdrawn molten portions to heat the same and effect circulation of said heat portions upwardly through unmelted remaining portions of said batch, continuing said withdrawing, heating and circulating operations until all of the oleoresin in said batch is in a flowable state, settling out settable solids from said flowable mass of oleoresin and filtering the said flowable mass to remove suspended solids therefrom.

7. In the process of refining resinous material containing relatively higher melting point solid impurities, the steps which comprise heating a mass of such material to partially melt the same, forming a pond of molten material from said mass, allowing the molten material in said pond to stand to settle out settleable solid impurities, injecting, with a heating fluid, molten material in said pond from a level above the settled out solids therein back to the unmelted part of the mass to effect a further melting of the mass without agitating the settled solids in said pond.

8. The process of refining resinous material containing relatively higher melting point solid impurities which comprises heating a mass of such resinous material to partially melt the same, separating said melted portion from the main unmelted part of the mass and from larger sized solid impurities, forming a quiescent pond of said melted portion, allowing finer solid particles in said molten portion to settle to the bottom of the pond, and steam injecting molten material from said pond at a level above the settled out solids therein directly back into the unmelted part of the mass to further melt the same without agitating the settled out solids in the pond.

9. In the process of cleansing fusible resinous and gummy material containing relatively infusible solid foreign particles, the steps which comprise supporting a charge of such fusible material above a perforate barrier, heating said charge to melt the fusible material and cause the molten material to pass through said barrier and form a pond therebelow, and by means of a heating fluid injecting molten material from a point in said pond above the bottom thereof back into the charge above said barrier to effect a further melting of said charge.

10. The method of cleansing fusible resinous and gummy material containing solid foreign particles, which comprises heating a batch of such material, separating the resulting molten portion from the unmelted material and from the larger sized solid particles therein, heating said separated molten portion and recirculating the same through the unmelted material of said batch until a molten mass of desired fluidity is obtained, settling out the finer solid foreign particles from said molten mass and filtering the remaining molten material to remove additional foreign particles.

11. The method of cleansing fusible resinous and gummy material containing relatively infusible solid foreign particles, which comprises heating a mass of said material to partially melt the same, filtering out the larger sized solid particles therein, removing already melted material from said mass before the whole is fully melted, injecting steam into the removed melted material to heat and recirculate the same through said mass to melt additional portions thereof, continuing the injection of steam until the fusible material is all in a state of desired fluidity, allowing the finer sized solids to settle therefrom, and filtering the fluid material to remove suspended solid particles.

12. The method of cleansing crude resinous and gummy material containing relatively infusible solid foreign particles, which comprises indirectly heating a mass of such fusible material to partially melt the same, separating said melted portion from the main unmelted part of said mass and from larger sized solid particles, injecting steam directly into said separated melted portion to heat and recirculate the same through said main unmelted part to completely melt said unmelted part, settling out finer solid particles from the resulting molten mass and thereafter filtering said molten mass.

13. In the process of heating resinous and gummy material containing relative infusible solid impurities, the steps which comprise heating a mass of such material to partially melt the same, withdrawing molten portions of the mass and recirculating the withdrawn molten material through the unmelted portion of the mass.

14. In the process of heating resinous and gummy material containing relatively infusible solid impurities, the steps which comprise heating a mass of such material to partially melt the same, withdrawing molten portions of the mass, recirculating the withdrawn molten material through the unmelted portion of the mass, and simultaneously further heating the withdrawn molten material as it is being recirculated.

JAMES W. TAYLOR.